United States Patent
Hwang

(10) Patent No.: US 9,903,468 B2
(45) Date of Patent: Feb. 27, 2018

(54) HYDRAULIC PRESSURE SUPPLY SYSTEM OF AUTOMATIC TRANSMISSION

(71) Applicant: Hyundai Motor Company, Seoul (KR)

(72) Inventor: Jin Young Hwang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 9 days.

(21) Appl. No.: 15/184,142

(22) Filed: Jun. 16, 2016

(65) Prior Publication Data

US 2017/0167599 A1 Jun. 15, 2017

(30) Foreign Application Priority Data

Dec. 14, 2015 (KR) .................. 10-2015-0178595

(51) Int. Cl.

| F16H 61/00 | (2006.01) |
|---|---|
| F04B 23/08 | (2006.01) |
| F16H 57/04 | (2010.01) |
| F16H 61/02 | (2006.01) |
| F01M 1/16 | (2006.01) |
| F01M 1/02 | (2006.01) |

(Continued)

(52) U.S. Cl.
CPC ........... F16H 61/0031 (2013.01); F01M 1/02 (2013.01); F01M 1/16 (2013.01); F04B 23/08 (2013.01); F04C 2/344 (2013.01); F04C 15/008 (2013.01); F16H 57/0441 (2013.01); F16H 61/0206 (2013.01); F16K 11/07 (2013.01);

(Continued)

(58) Field of Classification Search
CPC ......... F16H 61/0031; F16H 2061/0037; F16H 61/0206; F16H 57/0441; Y10T 137/86163; F04B 23/08; F15B 2211/20592; F01M 1/16; F01M 1/02; F01M 2001/123

See application file for complete search history.

(56) References Cited

U.S. PATENT DOCUMENTS

| 6,196,806 B1 * | 3/2001 | Van Der Sluis .. F16H 61/66272 417/295 |
|---|---|---|
| 6,390,947 B1 * | 5/2002 | Aoki ..................... B60W 10/06 477/156 |

(Continued)

FOREIGN PATENT DOCUMENTS

| JP | 4333390 B2 | 9/2009 |
|---|---|---|
| JP | 2010-101427 A | 5/2010 |

(Continued)

*Primary Examiner* — Atif Chaudry
(74) *Attorney, Agent, or Firm* — Morgan, Lewis & Bockius LLP

(57) ABSTRACT

A hydraulic pressure supply system of an automatic transmission may include a mechanical oil pump fluidly-connected to the oil pan to supply oil to first and second discharge paths fluidly-connected to the mechanical oil pump, a first switch valve fluidly-connected to the first discharge path and selectively supplying oil to a first supply path fluidly-connected to the first switch valve, a second switch valve fluidly-connected to the first and second discharge paths and selectively supplying oil supplied in the first supply path to the transmission unit and a pressure control valve through a second supply path fluidly-connected to the second switch valve, respectively, a first solenoid valve actuator engaged to the first switch valve and a second solenoid valve actuator engaged to the second switch valve, and an electrical oil pump fluidly-connected to the oil pan to supply the oil to a third supply path fluidly-connected with the second supply path.

4 Claims, 6 Drawing Sheets

(51) Int. Cl.
  *F01M 1/12* (2006.01)
  *F04C 2/344* (2006.01)
  *F04C 15/00* (2006.01)
  *F16K 11/07* (2006.01)
  *F16K 15/00* (2006.01)
  *F16K 31/06* (2006.01)

(52) U.S. Cl.
  CPC .......... *F16K 15/00* (2013.01); *F16K 31/0613* (2013.01); *F01M 2001/0215* (2013.01); *F01M 2001/0238* (2013.01); *F01M 2001/123* (2013.01); *F15B 2211/20592* (2013.01); *F16H 2061/0037* (2013.01); *Y10T 137/86163* (2015.04)

(56) References Cited

U.S. PATENT DOCUMENTS

| | | | | |
|---|---|---|---|---|
| 7,107,870 | B2 * | 9/2006 | Kuhstrebe | B60K 6/485 74/335 |
| 2005/0188958 | A1 * | 9/2005 | Klenk | F02M 37/04 123/458 |
| 2008/0277239 | A1 * | 11/2008 | Gassmann | F04C 2/103 192/85.01 |
| 2010/0018808 | A1 * | 1/2010 | Gloge | F16H 61/0031 184/6.12 |
| 2010/0287924 | A1 * | 11/2010 | Dostal | F15B 11/17 60/430 |
| 2011/0118072 | A1 * | 5/2011 | Hashimoto | F16H 61/16 475/116 |
| 2012/0141302 | A1 * | 6/2012 | Hwang | F16H 61/0025 417/253 |
| 2014/0290767 | A1 * | 10/2014 | Jo | F16H 61/0206 137/565.11 |
| 2016/0033032 | A1 * | 2/2016 | Takagi | F16H 61/0031 475/117 |

FOREIGN PATENT DOCUMENTS

| | | |
|---|---|---|
| JP | 2011-247290 A | 12/2011 |
| JP | 5012321 B2 | 8/2012 |
| KR | 10-2014-0032032 A | 3/2014 |
| KR | 10-1461894 B1 | 11/2014 |

* cited by examiner

HYDRAULIC PRESSURE SUPPLY SYSTEM OF AUTOMATIC TRANSMISSION

CROSS-REFERENCE TO RELATED APPLICATION

The present application claims priority to and the benefit of Korean Patent Application No. 10-2015-0178595 filed on Dec. 14, 2015, the entire contents of which is incorporated herein for all purposes by this reference.

BACKGROUND OF THE INVENTION

Field of the Invention

The present invention relates to a hydraulic pressure supply system for an automatic transmission of a vehicle. More particularly, the present invention relates to a hydraulic pressure supply system for an automatic transmission of a vehicle for maximizing reduction of fuel consumption and minimizing capacity of a mechanical oil pump as an auxiliary function of an electric pump.

Description of Related Art

In recent years, as higher oil prices worldwide and exhaust gas discharge regulations have become more restrictive, car makers have devoted all their power to technological development which is environmentally friendly and can improve fuel efficiency.

Fuel efficiency in an automatic transmission may be improved by improving power transmission efficiency, and the power transmission efficiency can be improved by minimizing unnecessary power consumption in the oil pump.

However, in a conventional system, hydraulic pressure pumped by the mechanical pump driven by engine power is controlled by a pressure control valve and then supplied to each transmission unit, and accordingly, the amount of oil cannot be controlled, thereby causing unnecessary power loss.

In particular, generation of unnecessary hydraulic pressure at a high RPM area causes power loss, thereby reducing fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle, which can maximize fuel efficiency by realizing a plurality of pump operation modes and can minimize capacity of a mechanic oil pump as an auxiliary function of an electrical pump.

In an aspect of the present invention, a hydraulic pressure supply system of an automatic transmission for a vehicle, generating high-pressure hydraulic pressure from oil stored in an oil pan and supplying the hydraulic pressure to a transmission unit, may include a mechanical oil pump fluidly-connected to the oil pan and driven by an engine to pump the oil stored in the oil pan as a first high-pressure hydraulic pressure and to supply oil in the mechanical oil pump to first and second discharge paths fluidly-connected to the mechanical oil pump, a first switch valve fluidly-connected to the first discharge path and selectively supplying oil supplied to the first discharge path to a first supply path fluidly-connected to the first switch valve, a second switch valve fluidly-connected to the first and second discharge paths and selectively supplying oil supplied in the first supply path to the transmission unit and a pressure control valve through a second supply path fluidly-connected to the second switch valve, respectively, a first solenoid valve actuator engaged to the first switch valve to control the first switch valve and a second solenoid valve actuator engaged to the second switch valve to control the second switch valve, and an electrical oil pump fluidly-connected to the oil pan and driven by an electrical motor to pump the oil stored in the oil pan as a second high-pressure hydraulic pressure and to supply the oil stored in the oil to a third supply path fluidly-connected with the second supply path.

A recirculation path is fluidly connected to the oil pan, the first switch valve, the second switch valve, the mechanical oil pump, and the electrical oil pump.

The first switch valve is provided as a spool valve, and is connected to the first discharge path of the mechanical oil pump and selectively supplies the oil supplied to the first discharge path to the first supply path and the recirculation path depending on a turn-on or turn-off state of the first solenoid valve actuator.

The second switch valve is provided as a spool valve, and is connected to the first supply path of the mechanical oil pump and selectively supplies the oil supplied to the first supply path to the second supply path and the recirculation path depending on a turn-on or turn-off state of the second solenoid valve actuator.

A check valve preventing back flow is provided on the third supply path.

According to the exemplary embodiment of the present invention, five operation modes are realized depending on driving conditions to thereby maximize fuel efficiency.

In addition, as an auxiliary function of the electrical hydraulic pump, capacity of the mechanical oil pump can be minimized, thereby reducing a volumetric rate and heaviness of the vehicle.

Further, stability of hydraulic pressure can be acquired by optimum-driving only using the electrical hydraulic pump in the main driving area.

Further, since a fail-safe function is provided, system reliability can be improved even through the electrical hydraulic pump malfunctions.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
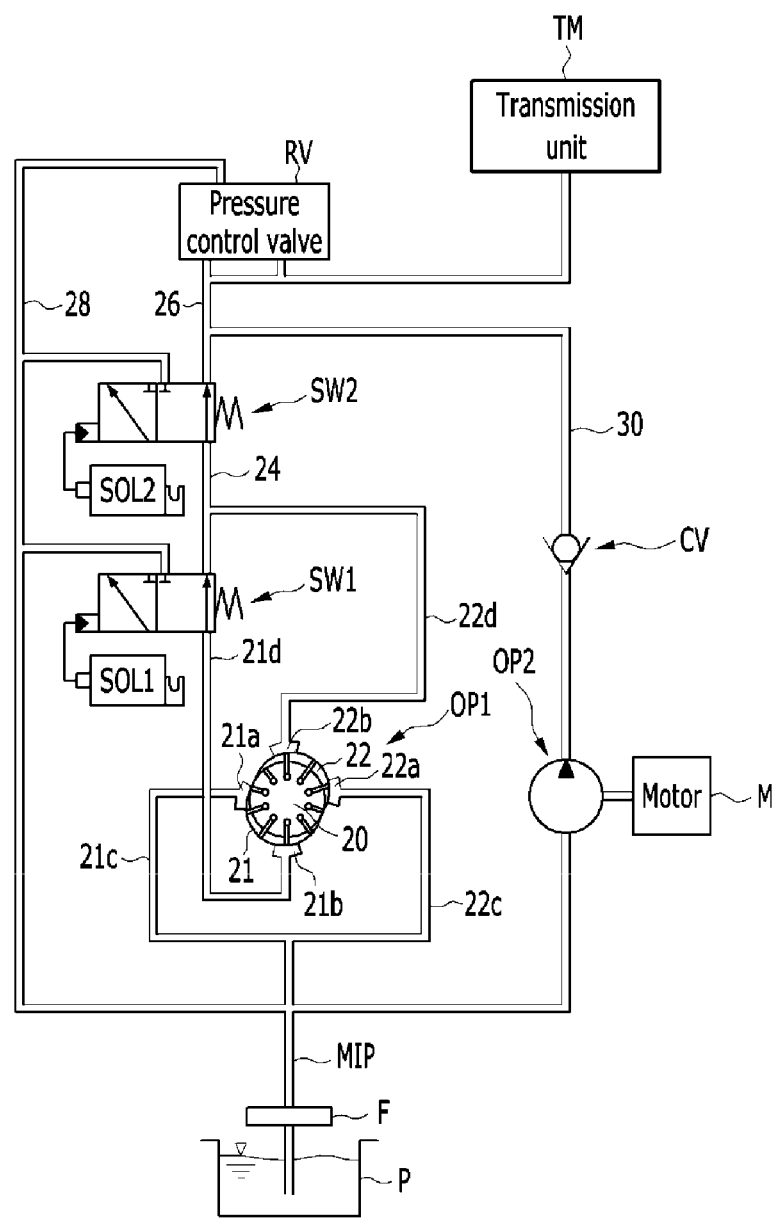
FIG. 1 is a schematic view of a hydraulic pressure supply system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are irrelevant to the description are omitted in order to clearly describe the present invention, and like reference numerals designate like elements throughout the specification.

In the following description, dividing names of components into first, second, and the like is to divide the names because the names of the components are the same as each other and an order thereof is not particularly limited.

FIG. 1 is a schematic view of a hydraulic pressure supply system according to an exemplary embodiment of the present invention.

Referring to FIG. 1, a hydraulic pressure supply system according to an exemplary embodiment of the present invention includes a mechanical hydraulic pump OP1, an electrical hydraulic pump OP2, a first switch valve SW1, a second switch valve SW2, a first solenoid valve actuator SOL1, a second solenoid valve actuator SOL2, and a check valve CV, and hydraulic pressures respectively pumped from the mechanical hydraulic pump OP1 and the electrical hydraulic pump OP2 may be individually supplied to a transmission unit TM or may be joined together in a predetermined pipe and then simultaneously supplied to the transmission unit TM.

The mechanical hydraulic pump OP1 is a vane pump and a first pump chamber 21 and a second pump chamber 22 are provided in axially symmetrical positions of a rotor 20, and the first pump chamber 21 and the second pump chamber 22 respectively include first and second intake ports 21$a$ and 22$a$ and first and second discharge ports 21$b$ and 22$b$.

The first and second intake ports 21$a$ and 22$a$ are connected with an oil pan P respectively through first and second intake paths 21$c$ and 22$c$, and the first and second discharge ports 21$b$ and 22$b$ are respectively connected with first and second discharge paths 21$d$ and 22$d$.

The first discharge path 21$d$ supplies hydraulic pressure to the first switch valve SW1, the first switch valve SW1 supplies hydraulic pressure to the second switch valve SW2 through a first supply path 24, and the second switch valve SW2 supplies hydraulic pressure to a pressure control valve RV that stably controls the hydraulic pressure supplied to the transmission unit TM.

The second discharge path 22$d$ is connected with the first supply path 24 and supplies the hydraulic pressure discharged from the second discharge portion 22$b$ to the pressure control valve RV that stably controls the hydraulic pressure supplied to the transmission unit TM through the second switch valve SW2.

The first intake path 21$c$ and the second intake path 22$c$ may be individually connected with the oil pan P, but in the present exemplary embodiment, the first and second intake paths 21$c$ and 22$c$ are respectively branched from a single main intake circuit MIP and then connected with the first and second intake ports 21$a$ and 22$a$.

In addition, a filter F is disposed on the main intake path MIP to filter an impurity include in the oil such that filtered oil can be supplied to the mechanical hydraulic pump OP1 and the electrical hydraulic pump OP2.

The first switch valve SW1 is provided as a spool valve and is connected to the first discharge path 21$b$ of the mechanical hydraulic pump OP1, and supplies the hydraulic pressure supplied to the first supply path 2$b$ to the first supply path 24 connected with the second switch valve SW2 or to a recirculation path 28.

In addition, the first switch valve SW1 is controlled by the first solenoid valve actuator SOL1, and when the first switch valve SW1 is turned off by the first solenoid valve actuator SOL1, the first discharge path 21$d$ is controlled to be connected with the first supply path 24 so as to supply hydraulic pressure supplied from the mechanical hydraulic pump OP1 to the second switch valve SW2, and when the first switch valve SW1 is turned on by the first solenoid valve actuator SOL1, the first discharge path 21$d$ may be controlled to be connected with the recirculation path 28 so as to return the hydraulic pressure supplied from the mechanical hydraulic pump OP1 without being supplied to the second switch valve SW2.

The second switch valve SW2 is provided as a spool valve and is connected to the first supply path 24 to supply hydraulic pressure supplied to the first supply path 24 to the second supply path 26 connected with the transmission unit TM or to the recirculation path 28.

In addition, the second switch valve SW2 is controlled by the second solenoid valve actuator SOL2, and when the second switch SW2 is turned off by the second solenoid valve actuator SOL2, the first and second supply paths 24 and 26 are controlled to be connected so as to supply the hydraulic pressure supplied from the mechanical hydraulic pump OP1 to the transmission unit TM, and when the second switch SW2 is turned on by the second solenoid valve actuator SOL2, the first supply path 24 and the recirculation path 28 are controlled to be connected so as to make the hydraulic pressure supplied from the mechanical hydraulic pump OP1 returned rather than being supplied to the transmission unit TM.

When the electrical hydraulic pump OP2 is driven by an additional electrical motor M, the electric hydraulic pump OP2 pumps the oil from the oil pan P through the main intake path MIP so as to supply the pumped oil to the second supply path 26 through the third supply path 30.

In addition, a check valve CV is disposed on the third supply path 30 to block hydraulic pressure flowing backward to the electric oil pump OP2 from the transmission unit TM side.

The transmission unit TM refers to a torque converter disposed in a downstream side of the pressure control valve RV that stably controls hydraulic pressure supplied from the mechanical hydraulic pump OP1 and the electrical hydraulic pump OP2 and related to transmission of the vehicle, each friction element (clutch, brake, and the like) of a planetary gear train that is directly related with transmission, each lubricating part, and each cooing part.

Figure 2:
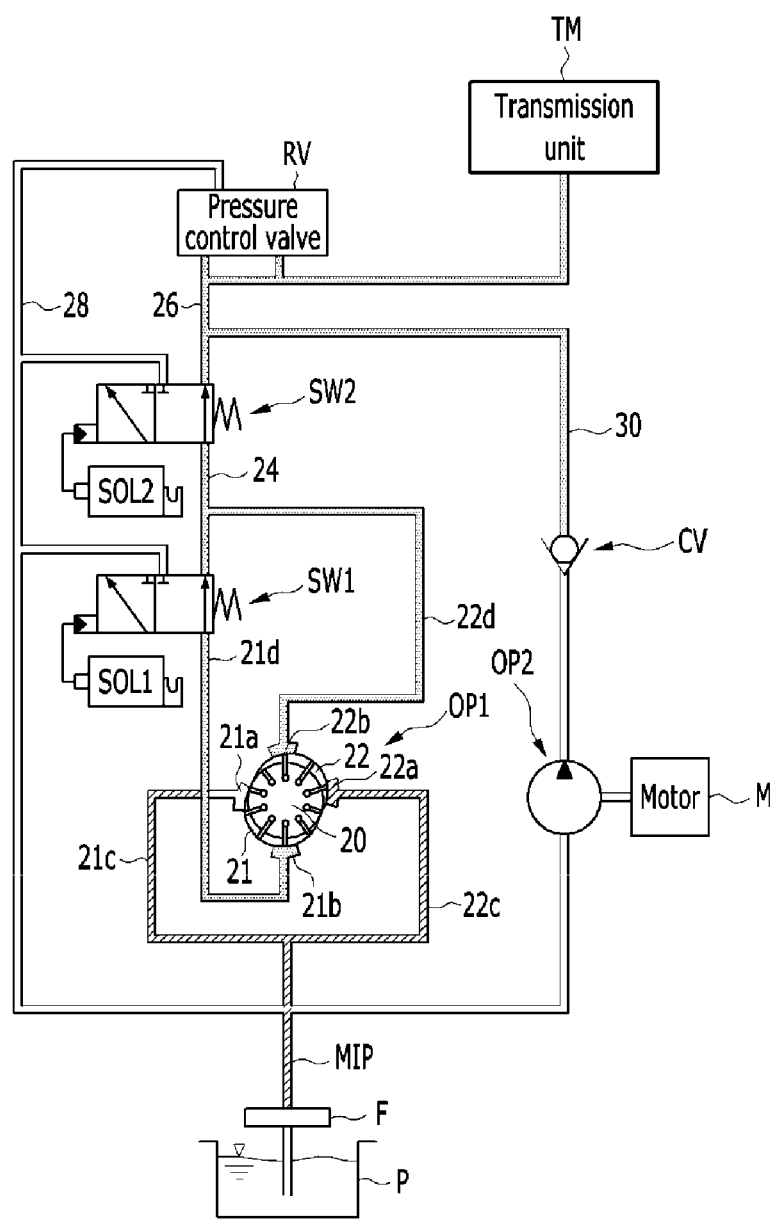
FIG. 2 shows flow of hydraulic pressure in the hydraulic pressure supply system operating in a first operation mode (full-discharge operation of mechanical hydraulic pump) according to the exemplary embodiment of the present invention.

FIG. 2 is a hydraulic pressure flowchart of the hydraulic pressure supply system in a first operation mode according to the exemplary embodiment of the present invention.

Referring to FIG. 2, in the first operation mode, hydraulic pressure can be supplied to the transmission unit TM only by driving of the mechanical pump OP1.

The first operation mode is controlled in an area that requires a large amount of extremely low and extremely high temperature oil.

In this case, the mechanical oil pump OP1 is driven while the first and second solenoid valve actuators SOL1 and SOL2 are turned off, and the amount of oil pumped in the mechanical hydraulic pump OP1 is discharged through the first and second discharge paths 21d and 22d and then supplied to the transmission unit TM.

Figure 3:
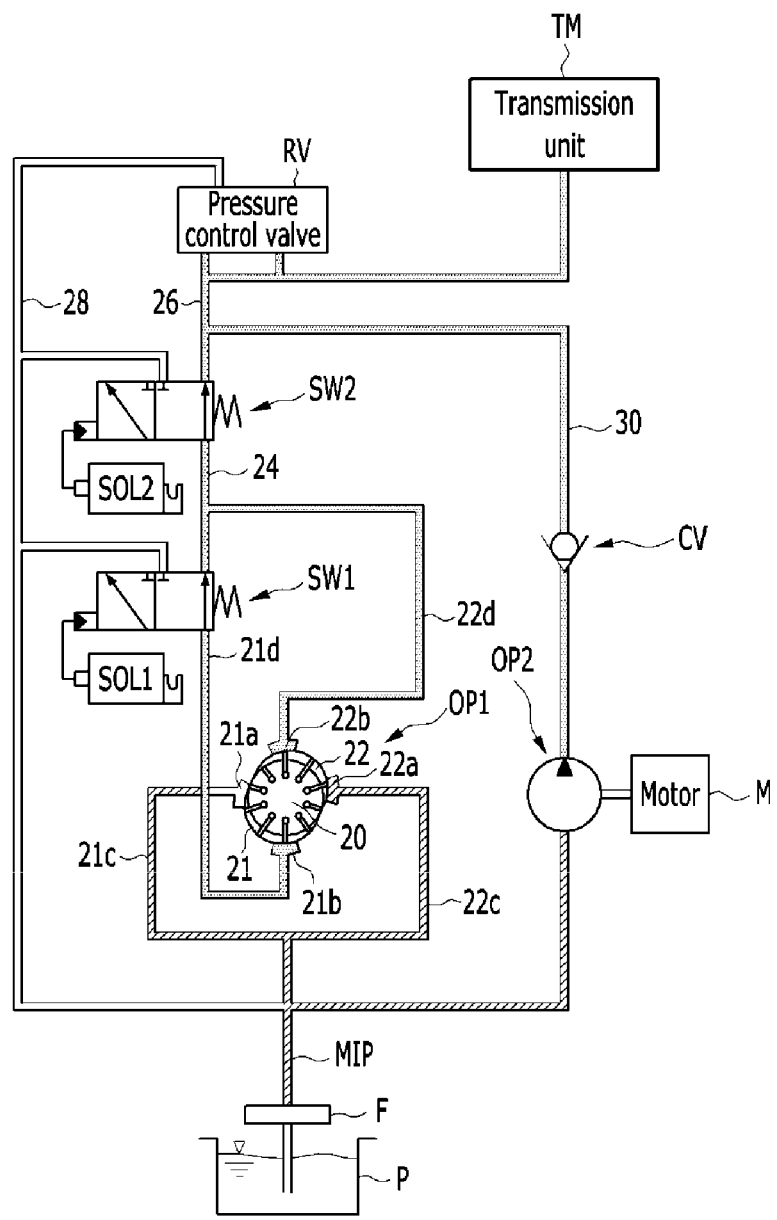
FIG. 3 shows flow of hydraulic pressure in the hydraulic pressure supply system operation in a second operation mode (full-discharge operation of mechanical pump and operation of electrical hydraulic pump) according to the exemplary embodiment of the present invention.

FIG. 3 is a hydraulic pressure flowchart of the hydraulic pressure supply system in a second operation mode according to the exemplary embodiment of the present invention.

Referring to FIG. 3, in the second operation mode, the mechanical hydraulic pump OP1 and the electrical hydraulic pump OP2 both are driven.

The second operation mode is controlled in a condition that requires a large amount of oil due to shift-speed and sudden acceleration at an extremely low and extremely high temperature, and the mechanical oil pump OP1 and the electrical oil pump OP2 both are driven while the first and second solenoid valve actuators SOL1 and SOL2 both are turned off.

Accordingly, the total amount of oil pumped from the mechanical hydraulic pump OP1 and the total amount of oil pumped from the electrical hydraulic pump OP2 are supplied to the transmission unit TM.

Figure 4:
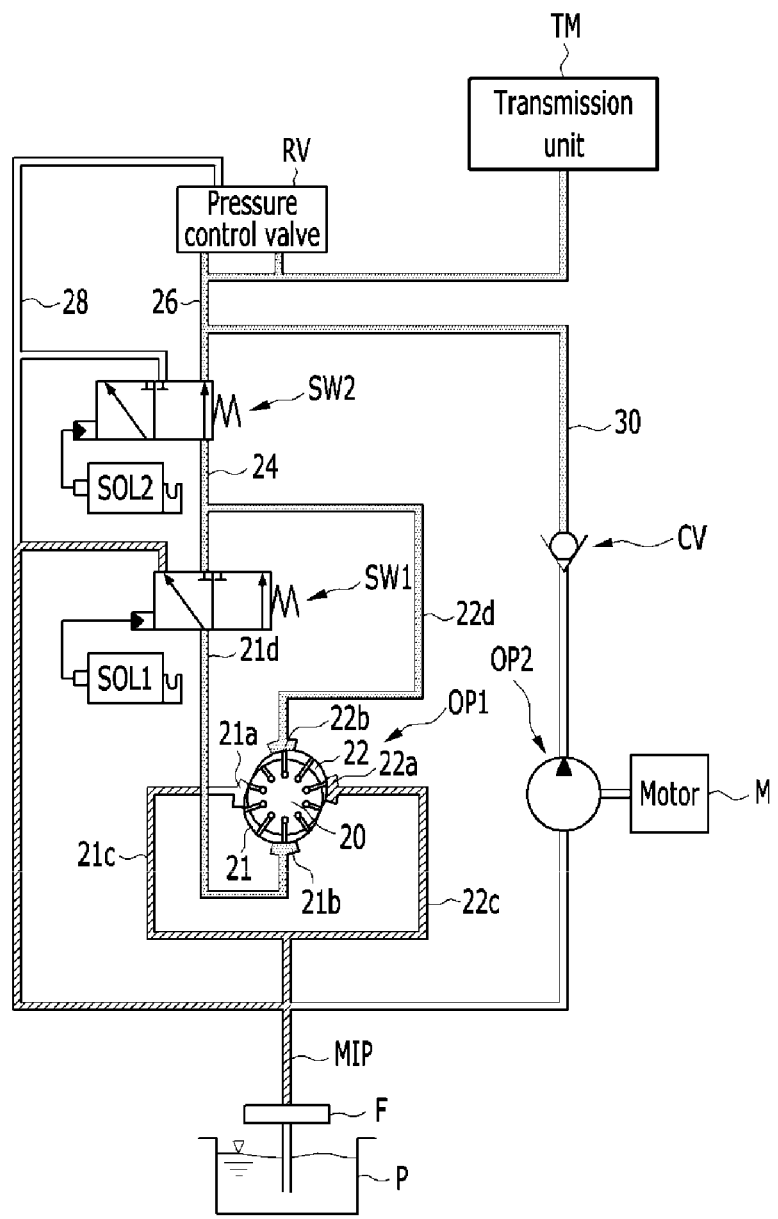
FIG. 4 shows flow of hydraulic pressure in the hydraulic pressure supply system operation in a second operation mode (half-discharge operation of mechanical hydraulic pump) according to the exemplary embodiment of the present invention.

FIG. 4 is a hydraulic pressure flowchart of the hydraulic pressure supply system in a third operation mode according to the exemplary embodiment of the present invention.

Referring to FIG. 4, the third operation mode is controlled in a minimum flow in a room-temperature and low-torque area, and fuel consumption can be optimized.

In such a third operation mode, while the mechanical pump OP1 is driven and the electrical hydraulic pump OP2 is stopped, the first solenoid valve actuator SOL1 is turned on and the second solenoid valve actuator SOL2 is turned off.

Thus, the amount of oil discharged through the first discharge path 21d of the mechanical hydraulic pump OP1 is returned through the first switch valve SW1 and the recirculation path 28, and only the amount of oil discharged through the second discharge path 22d is supplied to the transmission unit TM through the second switch valve SW2.

Figure 5:
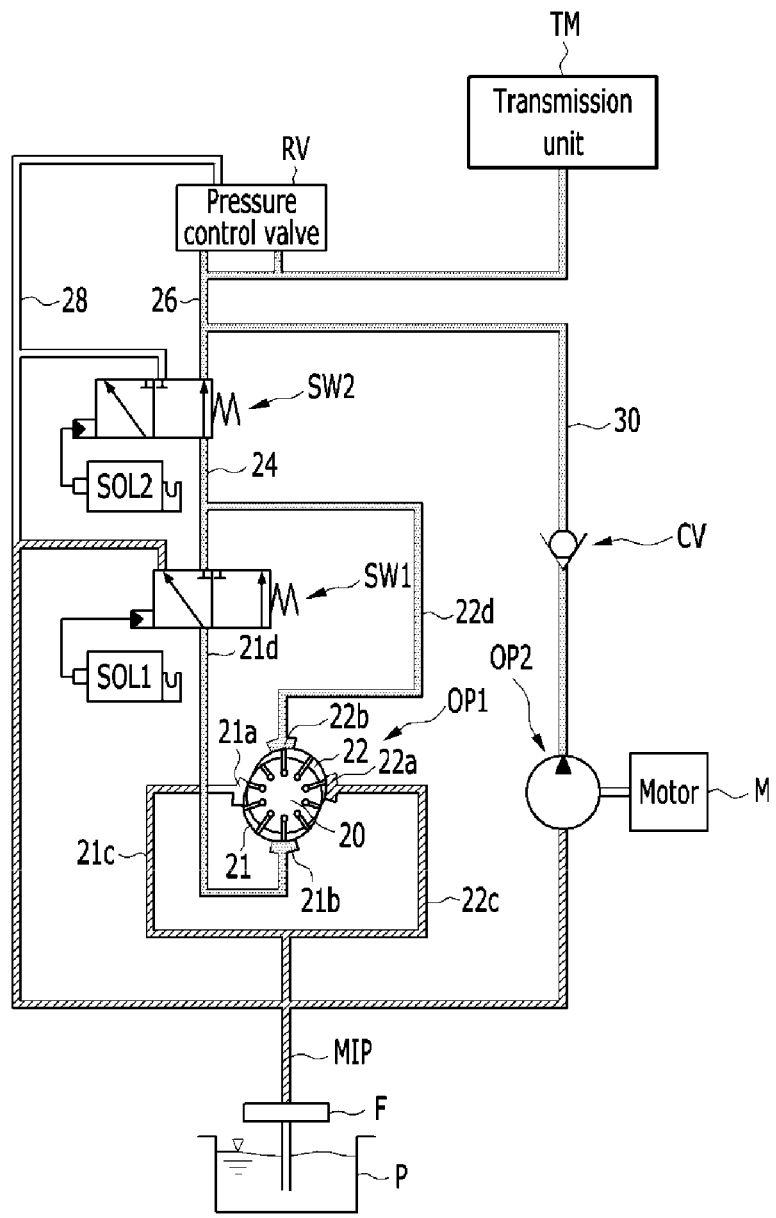
FIG. 5 shows flow of hydraulic pressure in the hydraulic pressure supply system operation in a second operation mode (half-discharge operation of mechanical hydraulic pump and operation of electrical hydraulic pump) according to the exemplary embodiment of the present invention.

FIG. 5 is a hydraulic pressure flowchart of the hydraulic pressure supply system in a fourth operation mode according to the exemplary embodiment of the present invention.

Referring to FIG. 5, the fourth operation mode is controlled when the amount of oil between half-discharge and full-discharge of the mechanical oil pimp OP1 is required in a condition of a minimum flow of a room-temperature and low-torque area (i.e., a condition that requires sudden flow for speed-shifting, damper clutch control, and the like).

In such a fourth operation mode, the first solenoid valve actuator SOL1 is turned on and the second solenoid valve actuator SOL2 is turned off while the mechanical pump OP1 and the electrical hydraulic pump OP2 both are driven.

Accordingly, the amount of oil discharged through the first discharge path 21d of the mechanical hydraulic pump OP1 is returned through the first switch valve SW1 and the recirculation path 28, and the amount of oil discharged through the second discharge path 22d and the amount of oil discharged from the electrical hydraulic pump OP2 are joined at the second supply path 26 and then supplied to the transmission unit TM.

Figure 6:
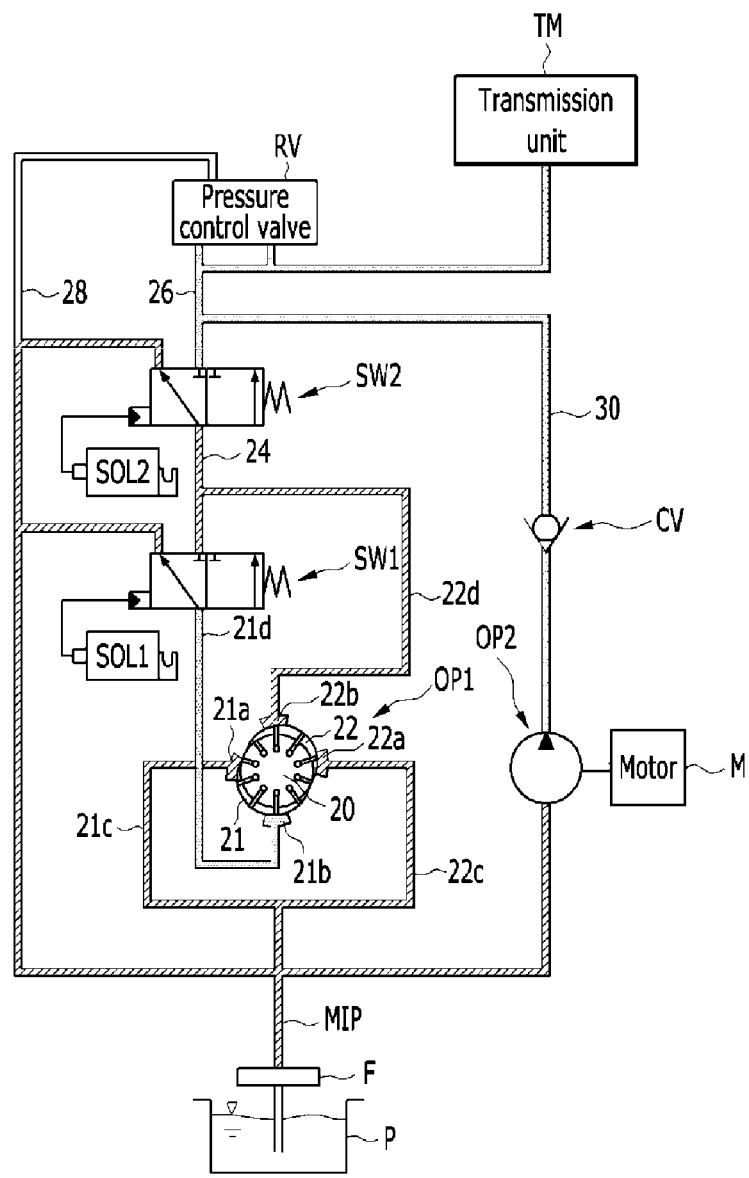
FIG. 6 shows flow of hydraulic pressure in the hydraulic pressure supply system operation in a second operation mode (operation of only electrical hydraulic pump) according to the exemplary embodiment of the present invention.

FIG. 6 is a hydraulic pressure flowchart of the hydraulic pressure supply system in a fifth operation mode according to the exemplary embodiment of the present invention.

Referring to FIG. 6, the fifth operation mode is controlled a main operating area (i.e., fuel consumption area, oil temperature of 20° C. to 100° C.), a low pressure under middle load condition, and in an idle stop condition (i.e., engine stop) for an idle stop and go (ISG) function, only the electrical hydraulic pump OP2 is driven and the amount of oil pumped from the electrical hydraulic pump OP2 is supplied to the transmission unit TM through the three supply path 30 and the second supply path 26.

In this case, the first solenoid valve actuator SOL1 and second solenoid valve actuator SOL2 both are turned on such that the amount of oil discharged from the mechanical oil pump OP1 are supplied to the recirculation path 28 through the first and second switch valves SW1 and SW2 and then returned.

Accordingly, although the mechanical hydraulic pump OP1 is driven, hydraulic pressure is returned through the recirculation path 28 without resistance such that a driving loss of the mechanical hydraulic pump OP1 is very low.

In such a fifth operation mode, rotation speed of the electrical oil pump OP2 is actively controlled (i.e., on-demand control) according to the above-stated driving condition such that optimal fuel consumption efficiency can be acquired.

As described above, the hydraulic supply system according to the exemplary embodiment of the present invention realizes five pump operation modes according to driving condition such that reduction of fuel consumption can be effectively optimized.

In addition, capacity of the mechanical oil pump served as an auxiliary pump of the electrical hydraulic pump is minimized to thereby reduce a volumetric rate and heaviness of the vehicle.

Further, stability of hydraulic pressure can be acquired by optimum-driving only using the electrical hydraulic pump in the main driving area.

Further, since a fail-safe function is provided, system reliability can be improved even through the electrical hydraulic pump malfunctions.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle, generating high-pressure hydraulic pressure from oil stored in an oil pan and supplying the hydraulic pressure to a transmission unit, including:
    a mechanical oil pump fluidly-connected to the oil pan and driven by an engine to pump the oil stored in the oil pan as a first high-pressure hydraulic pressure and to supply oil in the mechanical oil pump to first and second discharge paths fluidly-connected to the mechanical oil pump;
    a first switch valve fluidly-connected to the first discharge path and selectively supplying oil supplied to the first discharge path to a first supply path fluidly-connected to the first switch valve;
    a second switch valve fluidly-connected to the first and second discharge paths and selectively supplying oil supplied in the first supply path to the transmission unit and a pressure control valve through a second supply path fluidly-connected to the second switch valve, respectively;
    a first solenoid valve actuator engaged to the first switch valve to control the first switch valve and a second solenoid valve actuator engaged to the second switch valve to control the second switch valve; and
    an electrical oil pump fluidly-connected to the oil pan and driven by an electrical motor to pump the oil stored in the oil pan as a second high-pressure hydraulic pressure and to supply the oil stored in the oil to a third supply path fluidly-connected with the second supply path,
    wherein the first switch valve is provided as a spool valve, and is connected to the first discharge path of the mechanical oil pump and selectively supplies the oil supplied to the first discharge path to the first supply path and a recirculation path depending on a turn-on or turn-off state of the first solenoid valve actuator.

2. The hydraulic pressure supply system of claim 1, wherein the recirculation path is fluidly connected to the oil pan, the first switch valve, the second switch valve, the mechanical oil pump, and the electrical oil pump.

3. The hydraulic pressure supply system of claim 1, wherein the second switch valve is provided as a spool valve, and is connected to the first supply path of the mechanical oil pump and selectively supplies the oil supplied to the first supply path to the second supply path and the recirculation path depending on a turn-on or turn-off state of the second solenoid valve actuator.

4. The hydraulic pressure supply system of claim 1, wherein a check valve preventing back flow is provided on the third supply path.

* * * * *